US012810554B2

(12) United States Patent
Buerli et al.

(10) Patent No.: US 12,810,554 B2
(45) Date of Patent: *Nov. 24, 2026

(54) METHOD AND DEVICE FOR SYNCHRONIZING AUGMENTED REALITY COORDINATE SYSTEMS

(71) Applicant: Apple Inc., Cupertino, CA (US)

(72) Inventors: Michael E. Buerli, San Jose, CA (US); Andreas Moeller, Sunnyvale, CA (US); Michael Kuhn, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,040

(22) Filed: Jun. 22, 2023

(65) Prior Publication Data

US 2024/0005611 A1 Jan. 4, 2024

Related U.S. Application Data

(63) Continuation of application No. 17/007,928, filed on Aug. 31, 2020, now Pat. No. 11,727,648, which is a (Continued)

(51) Int. Cl.

*G06T 19/00* (2011.01)
*G06F 3/01* (2006.01)

(Continued)

(52) U.S. Cl.

CPC ............ *G06T 19/006* (2013.01); *G06F 3/011* (2013.01); *G06T 7/33* (2017.01); *G06T 7/337* (2017.01);

(Continued)

(58) Field of Classification Search

CPC ..... G06T 19/006; G06T 19/20; G06T 19/003; G06T 7/70; G06T 2200/04;

(Continued)

(56) References Cited

U.S. PATENT DOCUMENTS

2004/0128102 A1 7/2004 Petty et al.
2011/0298824 A1* 12/2011 Lee ....................... A63F 13/327 345/633

(Continued)

*Primary Examiner* — Xiao M Wu
*Assistant Examiner* — Scott E Sonners
(74) *Attorney, Agent, or Firm* — Fernando & Partners, LLP

(57) ABSTRACT

According to various implementations, a method is performed at a first electronic device with a non-transitory memory and one or more processors. The method includes determining a reference location in a three-dimensional space based on a feature. The feature is generated by a second electronic device. The method includes obtaining, for the reference location, first reference coordinates in an augmented reality coordinate system of the first electronic device and second reference coordinates in an augmented reality coordinate system of the second electronic device. The method includes determining a coordinate transformation based on a function of the first reference coordinates and the second reference coordinates. The method includes synchronizing an augmented reality coordinate system of the first electronic device with an augmented reality coordinate system of the second electronic device using the coordinate transformation.

18 Claims, 8 Drawing Sheets

Related U.S. Application Data continuation of application No. 16/015,661, filed on Jun. 22, 2018, now Pat. No. 10,803,666.

(60) Provisional application No. 62/564,851, filed on Sep. 28, 2017.

(51) Int. Cl.

| | |
|---|---|
| ***G06T 7/33*** | (2017.01) |
| ***G06T 7/70*** | (2017.01) |
| ***G06T 15/08*** | (2011.01) |

(52) U.S. Cl.

CPC ................ *G06T 7/70* (2017.01); *G06T 15/08* (2013.01); *G06T 2207/30208* (2013.01); *G06T 2219/024* (2013.01)

(58) Field of Classification Search

CPC . G06T 2207/30204; G06T 7/73; G06T 15/20; G06T 19/00; G06T 7/75; G06T 15/00; G06T 17/00; G02B 2027/014; G02B 2027/0178; G02B 2027/0138; G06F 3/011; G06F 3/04815; G06F 3/04842; G06F 3/017; G06F 3/0346; G06K 9/00671; A63F 2300/66; A63F 2300/8082

See application file for complete search history.

(56) References Cited

U.S. PATENT DOCUMENTS

| | | | | |
|---|---|---|---|---|
| 2012/0306850 | A1 | 12/2012 | Balan et al. | |
| 2012/0314936 | A1* | 12/2012 | Ishige | G06T 19/006 382/154 |
| 2014/0267234 | A1* | 9/2014 | Hook | G06T 19/006 345/419 |
| 2014/0306866 | A1 | 10/2014 | Miller et al. | |
| 2015/0070389 | A1 | 3/2015 | Goto et al. | |
| 2015/0213649 | A1* | 7/2015 | Morishita | G06T 19/006 345/419 |
| 2015/0369593 | A1 | 12/2015 | Myllykoski | |
| 2016/0321530 | A1 | 11/2016 | Troy et al. | |

* cited by examiner

METHOD AND DEVICE FOR SYNCHRONIZING AUGMENTED REALITY COORDINATE SYSTEMS

CROSS-REFERENCE TO RELATED APPLICATIONS

This application is a continuation application of U.S. patent application Ser. No. 17/007,928 filed on Aug. 31, 2020, which is a continuation application of U.S. patent application Ser. No. 16/015,661 filed on Jun. 22, 2018 and issued as U.S. Pat. No. 10,803,666 on Oct. 13, 2020, which claims priority to U.S. Provisional Patent App. No. 62/564,851, filed on Sep. 28, 2017, which are hereby incorporated by reference in their entirety.

TECHNICAL FIELD

The present disclosure generally relates to augmented reality, and in particular, to systems, methods, and devices for synchronizing augmented reality coordinate systems.

BACKGROUND

While providing an augmented reality experience to a user in an environment, an augmented reality coordinate system is used to map the environment, track the user's location in the environment, and present virtual objects in the environment. However, when multiple users are present in the environment, each user maintains their own augmented reality coordinate system, complicating the sharing of the augmented reality experience amongst the multiple users.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
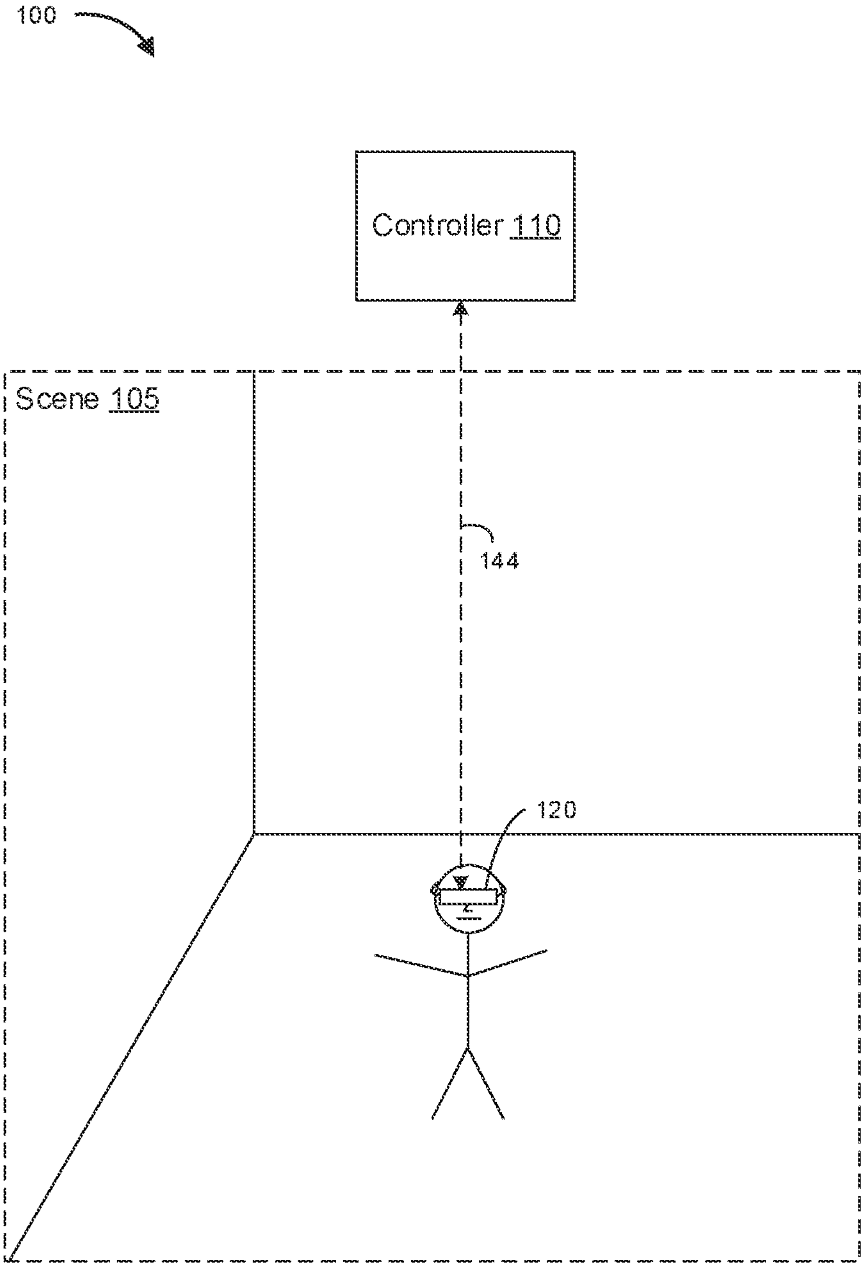
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synchronizing augmented reality coordinate systems. The method includes obtaining, for a reference location in a three-dimensional space, first reference coordinates in an augmented reality coordinate system of the first electronic device. The method includes obtaining, for the reference location in the three-dimensional space, second reference coordinates based on transformation data received from a second electronic device. The method includes determining a coordinate transformation based on the first reference coordinates and the second reference coordinates. The method includes synchronizing the augmented reality coordinate system of the first electronic device with an augmented reality coordinate system of the second electronic device using the coordinate transformation.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

When multiple user devices, with multiple augmented reality coordinate systems are present in an environment, synchronizing the augmented reality coordinate systems allows placement of virtual objects at a real location by one user that can be presented at the real location to other users in an augmented reality experience.

In various implementations, the augmented reality coordinate systems are synchronized by placement of a prefabricated marker (a printed feature or a cone) in the environment at a location that each user device can, independently, set as an origin in its respective augmented reality coordinate system. However, placing such a marker in various environments may not be feasible or, at least, inconvenient. Accordingly, methods are described herein in which two or more user devices can synchronize their augmented reality coordinate systems without placement of a prefabricated marker. Rather, two or more user devices communicate to select a feature of the environment as a replacement for the marker. In various implementations, one of the devices generates the feature by displaying the feature on a display of the device or projecting the feature into the environment.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some embodiments, the controller 110 is configured to manage and coordinate an augmented reality/virtual reality (AR/VR) experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some embodiments, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some embodiments, the HMD 120 is configured to present the AR/VR experience to the user. In some embodiments, the HMD 120 includes a suitable combination of software, firmware, and/or hardware. The HMD 120 is described in greater detail below with respect to FIG. 3. In some embodiments, the functionalities of the controller 110 are provided by and/or combined with the HMD 120.

According to some embodiments, the HMD 120 presents an augmented reality/virtual reality (AR/VR) experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting augmented virtuality (AV) content, the HMD 120 is configured to present elements of the real world, or representations thereof, combined with or superimposed over a user's view of a computer-simulated environment. In some implementations, while presenting a VR experience, the HMD 120 is configured to present VR content.

In some embodiments, the user wears the HMD120 on his/her head. As such, the HMD 120 includes one or more AR/VR displays provided to display the AR/VR content. For example, in various implementations, the HMD 120 encloses the field-of-view of the user. In some embodiments, the HMD 120 is replaced with a handheld device (such as a smartphone or tablet) configured to present AR/VR content in which the user does not wear the HMD 120, but holds the device with a display directed towards the field-of-view of the user and a camera directed towards the scene 105. In some embodiments, the HMD 120 is replaced with an AR/VR chamber, enclosure, or room configured to present AR/VR content in which the user does not wear or hold the HMD 120.

Figure 2:
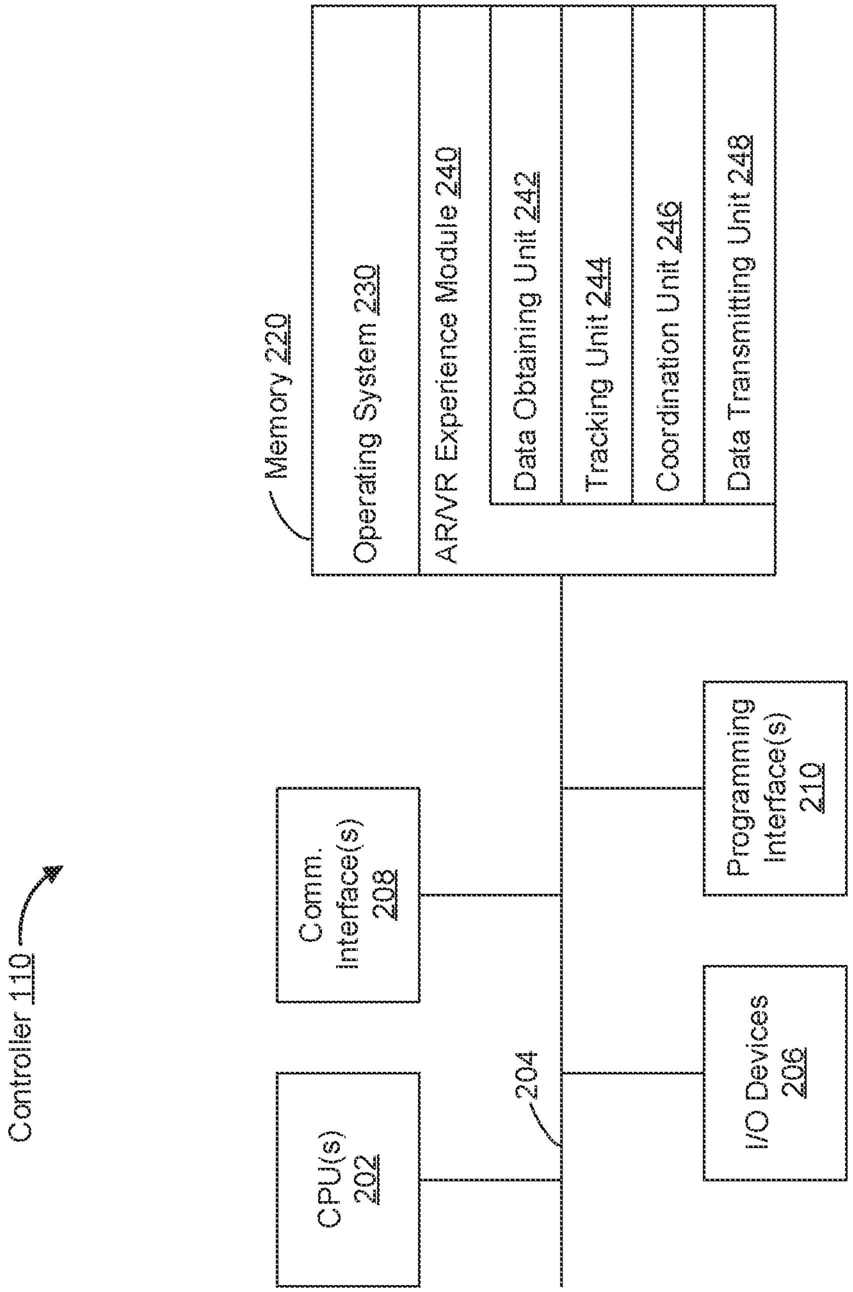
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
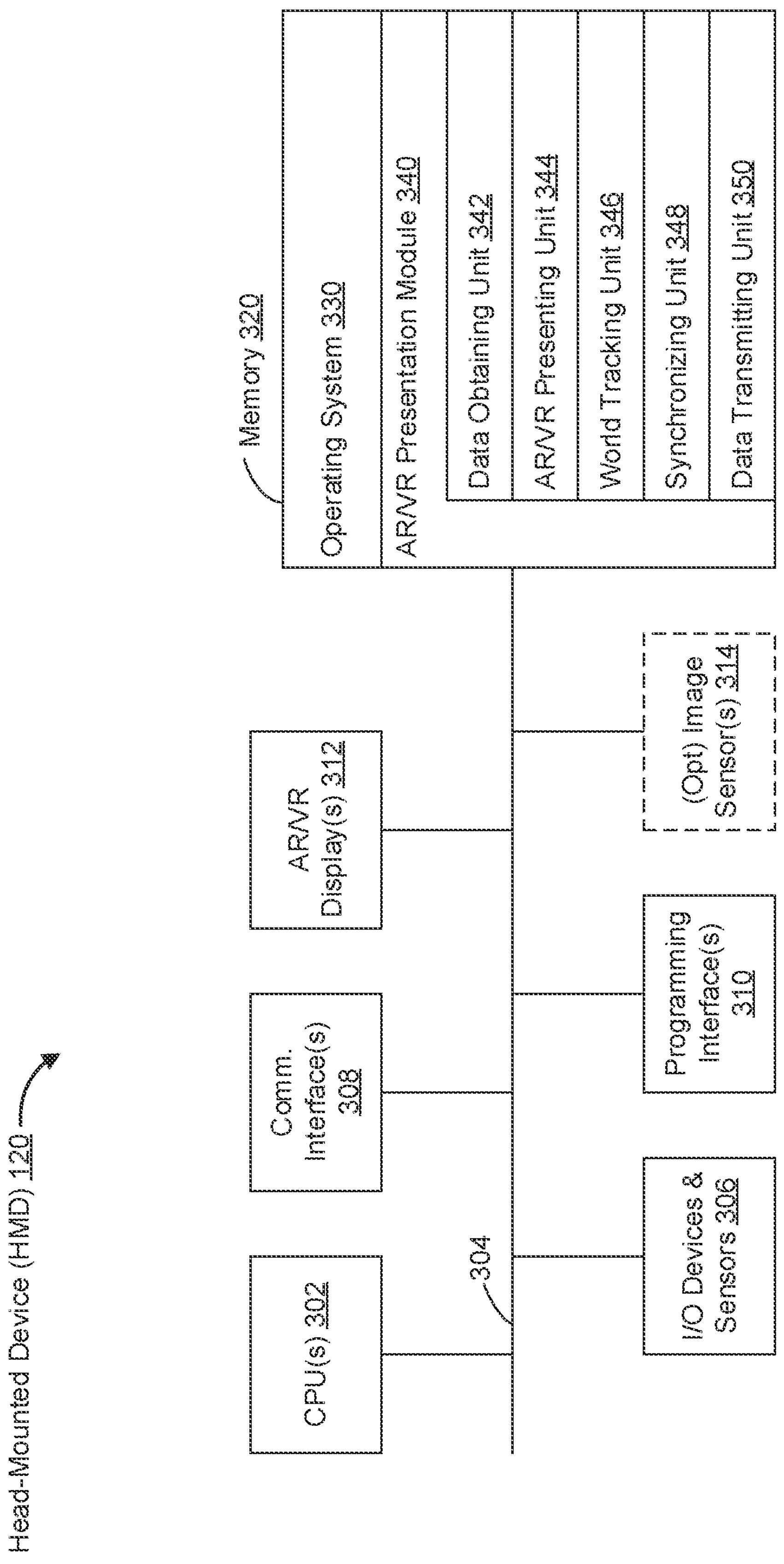
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more AR/VR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some embodiments, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some embodiments, the one or more AR/VR displays 312 are capable of presenting AR and VR content. In some embodiments, the one or more AR/VR displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB camera (e.g., with a complimentary metal-oxide-semiconductor (CMOS) image sensor or a charge-coupled device (CCD) image sensor), IR camera, event-based camera, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an AR/VR presentation module 340.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, a world tracking unit 346, a synchronization unit 348, and a data transmitting unit 350.

In some implementations, the data obtaining unit 342 is configured to obtain data (e.g., presentation data, interaction data, sensor data, location data, etc.) from at least to the controller 110. To that end, in various implementations, the data obtaining unit 342 includes instructions and/or logic therefor, and heuristics and metadata therefor.

In some implementations, the AR/VR presenting unit 344 is configured to present AR/VR content via the one or more AR/VR displays 312. To that end, in various implementations, the AR/VR presenting unit 344 includes instructions and/or logic therefor, and heuristics and metadata therefor.

In some implementations, the world tracking unit 346 is configured to obtain, for a reference location in a three-dimensional space, first reference coordinates in an augmented reality coordinate system. To that end, in various implementations, the world tracking unit 346 includes instructions and/or logic therefor, and heuristics and metadata therefor.

In some implementations, the data obtaining unit 342 is further configured to receive transformation data from a second electronic device.

In some implementations, the synchronizing unit 348 is configured to obtain, for the reference location in the three-dimensional space, second reference coordinates based on the transformation data received from the second electronic device. To that end, in various implementations, the AR/VR content sharing unit 348 includes instructions and/or logic therefor, and heuristics and metadata therefor. In some implementations, the synchronizing unit 348 is configured to determine a coordinate transformation based on the first reference coordinates and the second reference coordinates. In some implementations, the synchronizing unit 348 is configured to synchronize the augmented reality coordinate system of the first electronic device with an augmented reality coordinate system of the second electronic device using the coordinate transformation In some implementations, the data transmitting unit 350 is configured to transmit data (e.g., presentation data, location data, etc.) to at least the controller 110. To that end, in various implementations, the data transmitting unit 350 includes instructions and/or logic therefor, and heuristics and metadata therefor.

Although the data obtaining unit 342, the AR/VR presenting unit 344, the world tracking unit 346, the synchronization unit 348, and the data transmitting unit 350 are shown as residing on a single device (e.g., the HMD 120), it should be understood that in other implementations, any combination of the data obtaining unit 342, the AR/VR presenting unit 344, the world tracking unit 346, the synchronization unit 348, and the data transmitting unit 350 may be located in separate computing devices.

Moreover, FIG. 3 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
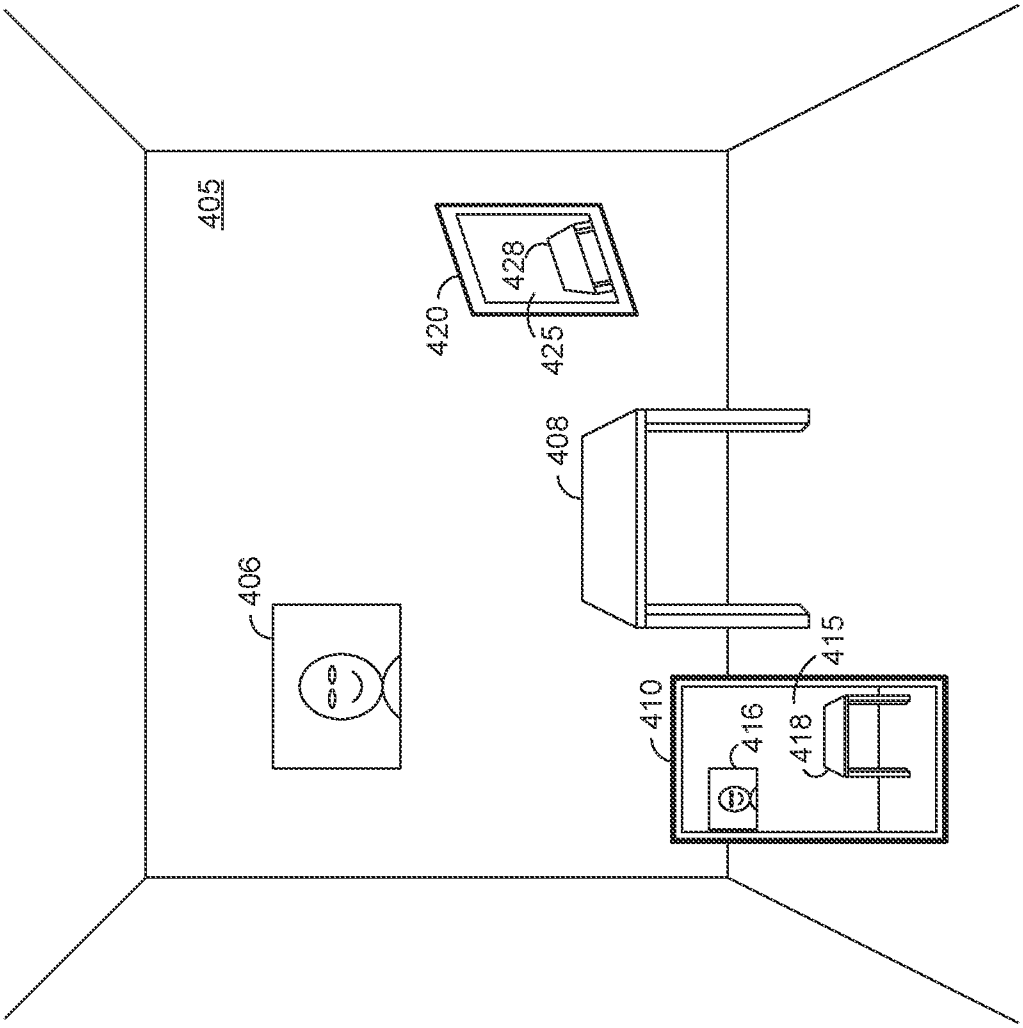
FIG. 4 illustrates a scene with a first handheld electronic device and a second handheld electronic device surveying the scene.

FIG. 4 illustrates a scene 405 with a first handheld electronic device 410 and a second handheld electronic device 420 surveying the scene 405. The scene 405 includes a picture 406 and a table 408.

The first handheld electronic device 410 displays a representation of the scene 415 including a first representation of the picture 416 and a first representation of the table 418. The second handheld electronic device 420 displays a representation of the scene 405 including a second representation of the table 428. In FIG. 4, a field of view of the second handheld electronic device 420 does not include the picture 406, and, thus, the second representation of the scene 425 (displayed by the second handheld electronic device 420) does not include a second representation of the picture.

In surveying the scene 405, the first handheld electronic device 410 generates a first map of the scene 405 including a number of first map coordinates in a first augmented reality coordinate system of the first handheld electronic device 410. The first map coordinates indicate the relative position of objects in the scene 405. In various implementations, each of the first map coordinates include three values indicating a position in three-dimension space.

In various implementations, the first handheld electronic device 410 generates the first map of the scene 405 using one or more SLAM (simultaneous location and mapping) algorithms. For example, in various implementations, the map of the scene 405 includes a point cloud, where the first map coordinates are associated with points in the point cloud, each point being a point on a surface (e.g., a boundary of the scene 405; such as a wall, floor, or ceiling; the picture 406; or the table 408) detected in the scene 405. In various implementations, each point is associated with metadata regarding the point, such as a color, texture, reflectance, or transmittance of the point on the surface. As another example, in various implementations, the map of the scene 405 includes a planar set, where the first map coordinates are associated with a parameter of planes in the planar set (e.g., a center of a plane or an intersection of two or more planes), each plane being a surface detected in the scene 405. In various implementations, each plane is associated with metadata regarding the plane, such as a color, texture, reflectance, or transmittance of the surface.

Similarly, in surveying the scene 405, the second handheld electronic device 420 generates a second map of the scene 405 including a number of second map coordinates in a second augmented reality coordinate system of the second handheld electronic device 420. However, in various implementations, the second augmented reality coordinate system is not synchronized with the first augmented reality coordinate system. For example, the first augmented reality coordinate system has a first set of map coordinates for the front-left-top corner of the table 408 and the second augmented reality coordinate system has a second set of map coordinates for the front-left-top corner of the table 408 that are different than the first set of map coordinates.

Accordingly, in various implementations, the first handheld electronic device 410 and the second handheld electronic device 420 exchange data to synchronize the first augmented reality coordinate system and the second augmented reality coordinate system.

Figure 5:
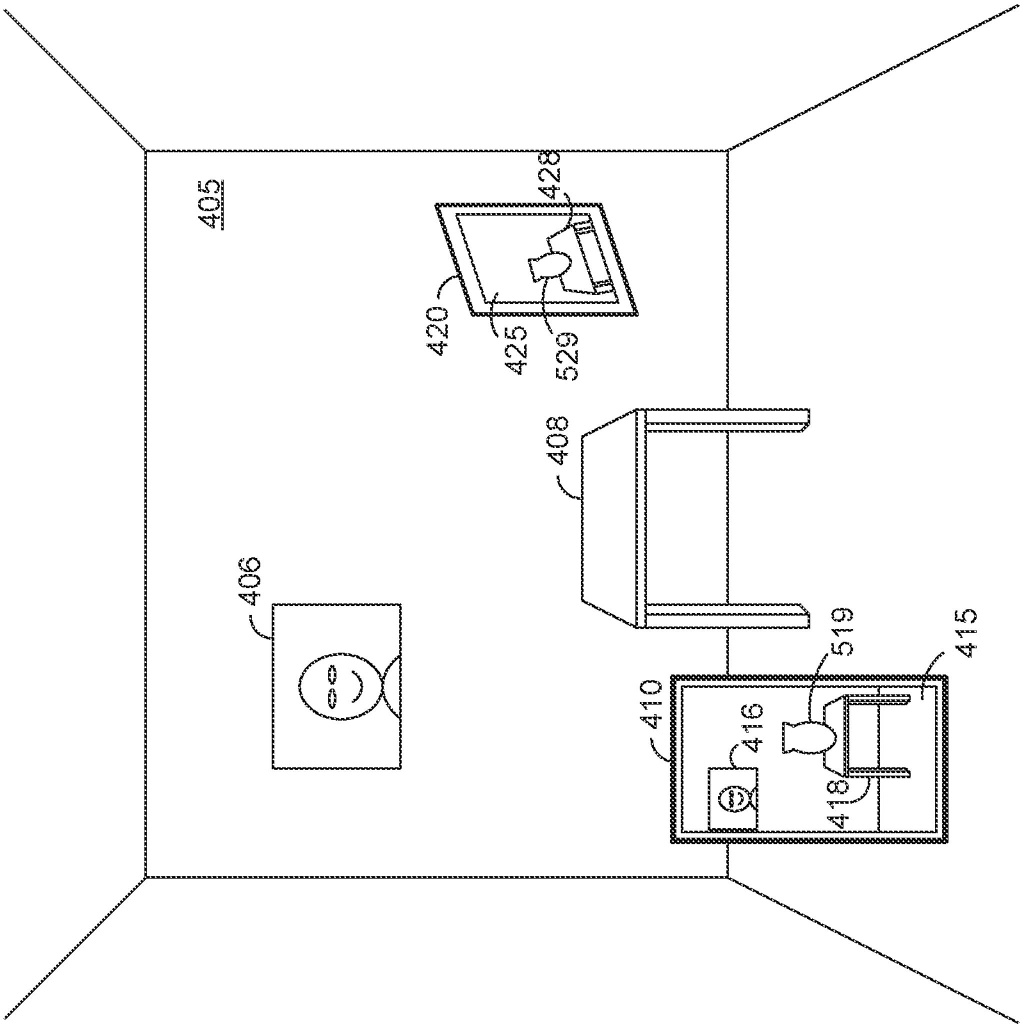
FIG. 5 illustrates the scene of FIG. 4 with a virtual object presented in accordance with some implementations.

FIG. 5 illustrates the scene 405 of FIG. 4 with a virtual object in accordance with some implementations. With the first augmented reality coordinate system of the first handheld electronic device 410 synchronized with the second augmented reality coordinate system of the second handheld electronic device 420, a virtual object, having virtual object coordinates in the synchronized augmented reality coordinate system, is represented by a first representation of the virtual object 519 in the first representation of the scene 415 at a same location as a second representation of the virtual object 529 in the second representation of the scene 425.

Figure 6:
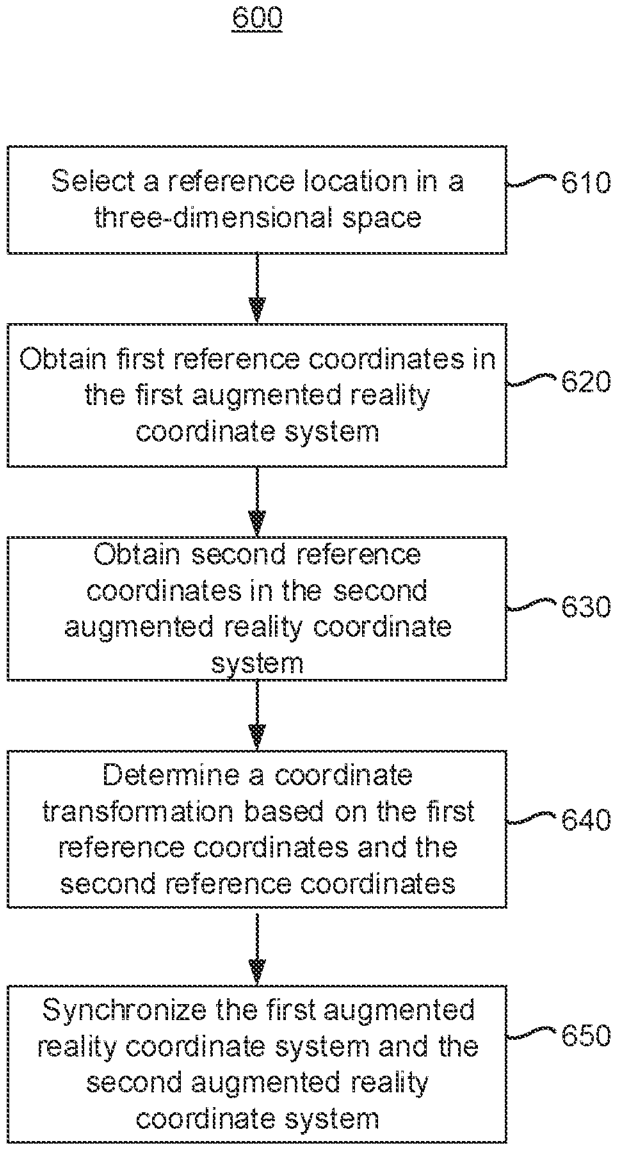
FIG. 6 is a flowchart representation of a method of synchronizing augmented reality coordinate systems in accordance with some implementations.

FIG. 6 is a flowchart representation of a method 600 of synchronizing augmented reality coordinate systems in accordance with some implementations. In some implementations (and as detailed below as an example), the method 600 is performed by a first handheld electronic device (in conjunction with a second handheld device), such as the first handheld electronic device 410 of FIG. 4 (and the second handheld electronic device 420 of FIG. 4). In various implementations, the method 600 is performed by a device with one or more processors, non-transitory memory, and one or more AR/VR displays (e.g., the HMD 120 FIG. 3). In some implementations, the method 600 is performed by processing logic, including hardware, firmware, software, or a combination thereof. In some implementations, the method 600 is performed by a processor executing code stored in a non-transitory computer-readable medium (e.g., a memory).

The method 600 begins, in block 610, with the first handheld electronic device selecting a reference location in a three-dimensional space (e.g., the scene 405 of FIG. 4).

In various implementations, selecting the reference location involves communication between the first handheld electronic device and the second handheld electronic device. In various implementations, the first handheld electronic device transmits a feature set, each representing a potential reference location, to the second handheld electronic device for selection. In various implementations, the feature set is a map of the scene. In response, the second handheld electronic device transmits a selection of a feature from the feature set. Thus, the first handheld electronic device selects, as the reference location, the feature selected by the second handheld electronic device. For example, in one embodiment (with reference to FIG. 4), the first handheld electronic device transmits data regarding the picture 406 and the table 408. In response, the second handheld electronic device transmits data indicating the top-left-front corner of the table 408, e.g., the coordinates in the second augmented reality coordinate system of that point. In various implementations, a feature is selected from a feature set based on a uniqueness of the feature, wherein the more unique a feature is, the more likely it is be to selected. The uniqueness of the feature can be measured in a number of ways, such as the color variation of the feature, spatial variation of the feature, or number of times similar features appear in the scene.

In various implementations, the second handheld electronic device transmits a feature set, each representing a potential reference location, to the first handheld electronic device for selection. In various implementations, the feature set is a map of the scene. In response, the first handheld electronic device transmits a selection of a feature from the feature set to the second handheld electronic device. For example, in one embodiment (with reference to FIG. 4), the second handheld electronic device transmits data regarding the table 408 (e.g., a point cloud of many points of the table 408). In various implementations, a feature is selected from a feature set based on a uniqueness of the feature, wherein the more unique a feature is, the more likely it is be to selected. The uniqueness of the feature can be measured in a number of ways, such as the color variation of the feature, spatial variation of the feature, or number of times similar features appear in the scene.

Figure 7:
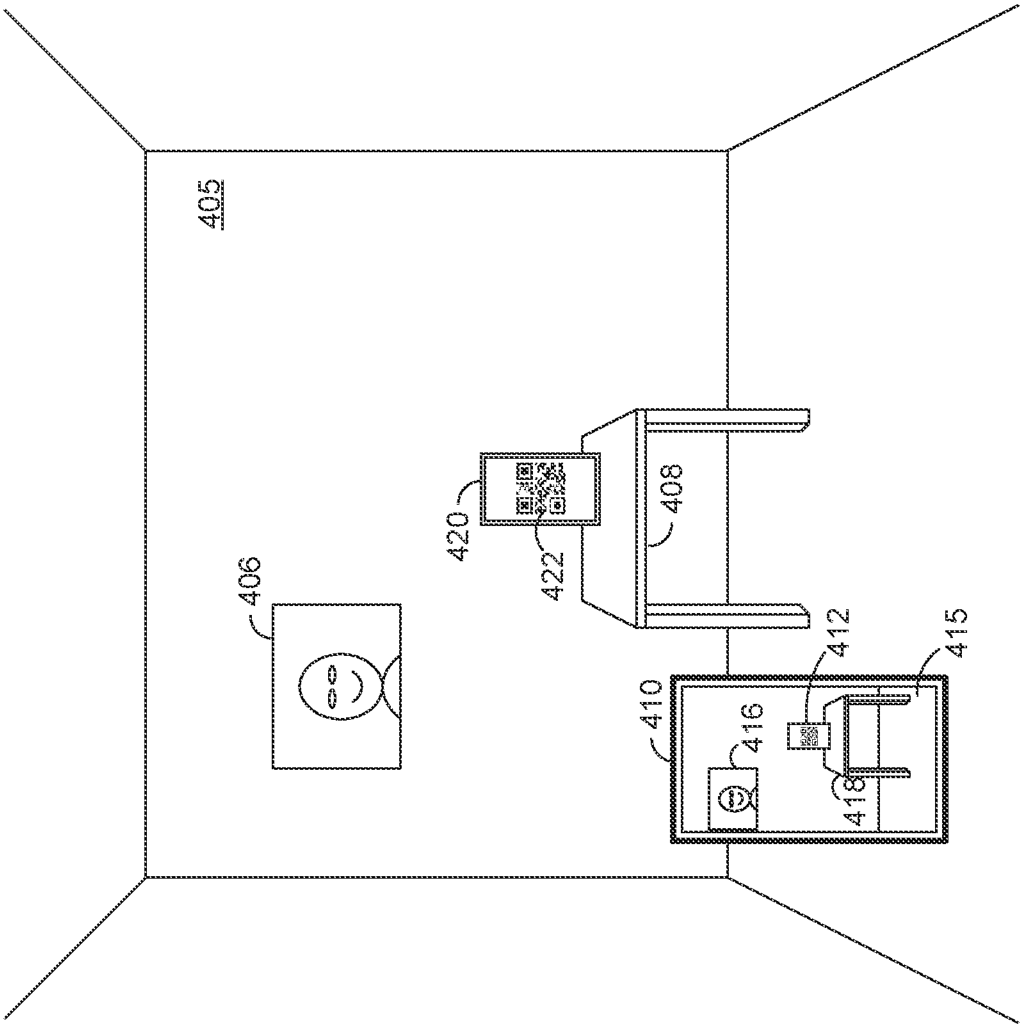
FIG. 7 illustrates the scene of FIG. 4 with the second handheld electronic device displaying a feature.

In various implementations, selecting the reference location includes detecting a feature generated by the second handheld electronic device. In various implementations, the feature is a unique shape or color pattern or a computer-readable code (e.g., a QR code). In various implementations, the second handheld electronic device generates the feature by displaying the feature on the display of the second handheld electronic device. FIG. 7 illustrates the scene 405 of FIG. 4 with the second handheld electronic device 420 displaying a feature 422. The first handheld electronic device detects the feature 422 and selects the location of the feature as the reference location. Accordingly, in various implementations, the reference location is a location of the second handheld electronic device.

Figure 8:
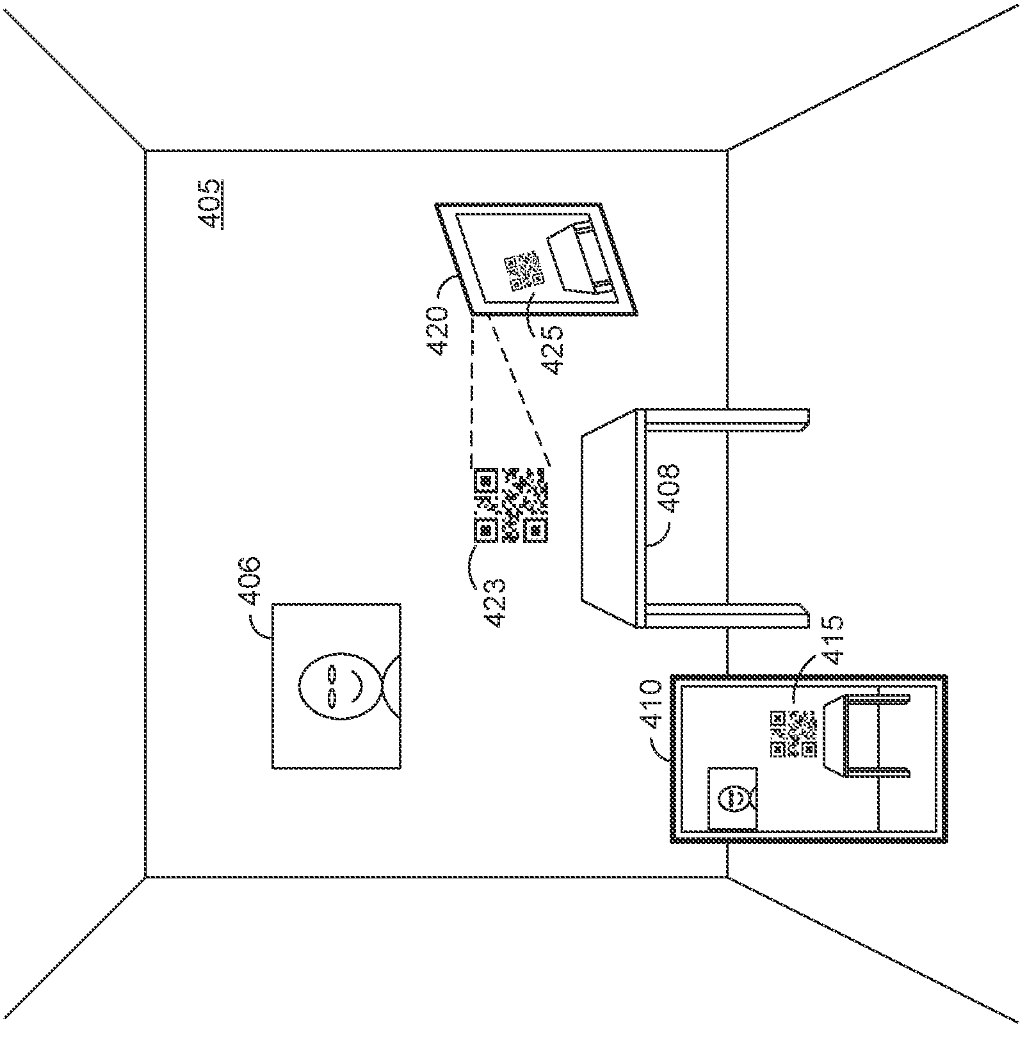
FIG. 8 illustrates the scene of FIG. 4 with the second handheld electronic device projecting a feature.

In various implementations, the second handheld electronic device generates the feature by projecting the feature on a surface (e.g., projecting a unique shape or color pattern or a computer-readable code onto a wall of the scene). FIG. 8 illustrates the scene 405 of FIG. 4 with the second handheld electronic device 420 projecting a feature 423. The first handheld electronic device detects the feature 423 and selects the location of the feature as the reference location.

In various implementations, the reference location is a location of the first handheld electronic device. Thus, in various implementations, the first handheld electronic device displays a feature to be detected by the second handheld electronic device.

The method 600 continues, in block 620, with the first handheld electronic device obtaining first reference coordinates for the reference location in the first augmented reality coordinate system.

The method 600 continues, in block 630, with the first handheld electronic device obtaining second reference coordinates for the reference location in the second augmented reality coordinate system (of the second handheld electronic device) based on transformation data received from the second handheld electronic device. In various implementations, the transformation data includes the second reference coordinates. In various implementations, the transformation data includes an offset between the first reference coordinates and the second reference coordinates. In various implementations, the second device transmits the transformation data via a peer-to-peer connection. For example, in some implementations, the second handheld electronic device transmits the transformation data via a wireless digital data communication link (such as BLUETOOTH) or over a network, such as the internet. In various implementations, the transformation is displayed by the second handheld electronic device. For example, in various implementations, a feature displayed by the second handheld electronic device (at the reference location) is a computer-readable code that encodes the second reference coordinates. Accordingly, in various implementations, the first handheld electronic device obtains the second set of coordinates without a peer-to-peer connection with the second handheld electronic device.

The method 600 continues, in block 640, with the first handheld electronic device determining a coordinate transformation based on the first reference coordinates and the second reference coordinates. In various implementations, the coordinate transformation includes an offset between the first set of coordinates and the second set of coordinates. In various implementations, the coordinate transformation is based on a device type of the first handheld electronic device and/or the second handheld electronic device. For example, in various implementations, the coordinate transform takes into account the size of the device (e.g., from the camera to the display). Accordingly, in various implementations, the transformation data includes information regarding a device type of the second handheld electronic device.

The method 600, continues, in block 650, with the first handheld electronic device synchronizing the first augmented reality coordinate system with the second augmented reality coordinate system using the coordinate transformation. In various implementations, the first handheld electronic device sets an origin of the first augmented reality coordinate to an origin of the second augmented reality coordinate system. Accordingly, the origin of the first augmented reality coordinate system and the origin of the second augmented reality coordinate system correspond to the same physical location in the three-dimensional space.

As described above with respect to FIG. 5, with the augmented reality coordinate system synchronized, a virtual object placed in the scene can be displayed at a representation of the same location on both the first handheld electronic device and the second handheld electronic device. Accordingly, in various implementations, the method 600 includes displaying, at a representation of an virtual object location in the three-dimensional space having virtual object coordinates in the first augmented reality coordinate system, a virtual object simultaneously displayed by the second handheld electronic device at a representation of the virtual object location in the three-dimensional space having the object coordinates in the second augmented reality coordinate system.

Further, with the augmented coordinate system synchronized, a map from the first handheld electronic device can be shared with the second handheld electronic device and integrated into a map of the second handheld electronic device. Similarly, a map from the second handheld electronic device can be shared with the first handheld electronic device and integrated into a map of the first handheld electronic device. Such sharing can be performed periodically, increasing the size, detail, and/or accuracy of the map on each handheld electronic device. Accordingly, in various implementations, the method 600 includes generating at least a portion of a map including map coordinates in the augmented reality coordinate system and transmitting, to the second handheld electronic device, the map coordinates to be added to a map in the second augmented reality coordinate system.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

generating, by a first device that utilizes a first augmented reality (AR) coordinate system, first location data for a second device that utilizes a second AR coordinate system that is different from the first AR coordinate system, wherein the first location data indicates a location of the second device in the first AR coordinate system;

receiving, by the first device from the second device, second location data for the second device, wherein the second location data indicates a location of the second device in the second AR coordinate system;

determining, based on the first location data and the second location data, an offset between the first AR coordinate system and the second AR coordinate system; and applying the offset to the first AR coordinate system by modifying a coordinate frame definition of the first AR coordinate system to synchronize the first AR coordinate system of the first device to the second AR coordinate system of the second device such that, after applying the offset, the origin of the first AR coordinate system is reassigned to and corresponds to the same physical location in a three-dimensional space as the origin of the second AR coordinate system.

2. The method of claim 1, further comprising:

after applying the offset to the first AR coordinate system, displaying a virtual object at a common location in the first AR coordinate system at the first device and the second AR coordinate system at the second device.

3. The method of claim 1, wherein the second device utilizes simultaneous location and mapping (SLAM) to determine the location of the second device in the second AR coordinate system.

4. The method of claim 1, wherein determining the offset comprises:

determining first reference coordinates that indicate the location of the second device in the first AR coordinate system;

obtaining second reference coordinates that indicate the location of the second device in the second AR coordinate system; and determining the offset based on a difference between the first reference coordinates and the second reference coordinates.

5. The method of claim 4, wherein the first device generates a first map using SLAM and the first map indicates the first reference coordinates; and wherein the second device generates a second map using SLAM and the second map indicates the second reference coordinates.

6. The method of claim 1, wherein the offset is based on a size of the first device or the second device.

7. The method of claim 6, wherein the size of the first device or the second device is a distance between a camera and a display.

8. A first device comprising:

one or more processors;

a non-transitory memory; and one or more programs, wherein the one or more programs are stored in the non-transitory memory and configured to be executed by the one or more processors, the one or more programs including instructions for:

generating, while utilizing a first augmented reality (AR) coordinate system, first location data for a second device that utilizes a second AR coordinate system that is different from the first AR coordinate system, wherein the first location data indicates a location of the second device in the first AR coordinate system;

receiving, from the second device, second location data for the second device, wherein the second location data indicates a location of the second device in the second AR coordinate system;

determining, based on the first location data and the second location data, an offset between the first AR coordinate system and the second AR coordinate system; and applying the offset to the first AR coordinate system by modifying a coordinate frame definition of the first AR coordinate system to synchronize the first AR coordinate system of the first device to the second AR coordinate system of the second device such that, after applying the offset, the origin of the first AR coordinate system is reassigned to and corresponds to the same physical location in a three-dimensional space as the origin of the second AR coordinate system.

9. The first device of claim 8, wherein the one or more programs further include instructions for:

after applying the offset to the first AR coordinate system, displaying a virtual object at a common location in the first AR coordinate system at the first device and the second AR coordinate system at the second device.

10. The first device of claim 8, wherein determining the offset comprises:

determining first reference coordinates that indicate the location of the second device in the first AR coordinate system;

obtaining second reference coordinates that indicate the location of the second device in the second AR coordinate system; and determining the offset based on a difference between the first reference coordinates and the second reference coordinates.

11. The first device of claim 10, wherein the first device generates a first map using SLAM and the first map indicates the first reference coordinates; and wherein the second device generates a second map using SLAM and the second map indicates the second reference coordinates.

12. The first device of claim 8, wherein the offset is based on a size of the first device or the second device.

13. The first device of claim 12, wherein the size of the first device or the second device is a distance between a camera and a display.

14. A non-transitory computer-readable medium having instructions encoded thereon which, when executed by a processor of a first device, cause the processor to perform operations comprising:

generating, while utilizing a first augmented reality (AR) coordinate system, first location data for a second device that utilizes a second AR coordinate system that is different from the first AR coordinate system, wherein the first location data indicates a location of the second device in the first AR coordinate system;

receiving, from the second device, second location data for the second device, wherein the second location data indicates a location of the second device in the second AR coordinate system;

determining, based on the first location data and the second location data, an offset between the first AR coordinate system and the second AR coordinate system; and applying the offset to the first AR coordinate system by modifying a coordinate frame definition of the first AR coordinate system to synchronize the first AR coordinate system of the first device to the second AR coordinate system such that, after applying the offset, the origin of the first AR coordinate system is reassigned to and corresponds to the same physical location in a three-dimensional space as the origin of the second AR coordinate system.

15. The non-transitory computer-readable medium of claim 14, wherein the instructions further cause the processor to perform operations comprising:

after applying the offset to the first AR coordinate system, displaying a virtual object at a common location in the first AR coordinate system at the first device and the second AR coordinate system at the second device.

16. The non-transitory computer-readable medium of claim 14, wherein determining the offset comprises:

determining first reference coordinates that indicate the location of the second device in the first AR coordinate system;

obtaining second reference coordinates that indicate the location of the second device in the second AR coordinate system; and determining the offset based on a difference between the first reference coordinates and the second reference coordinates.

17. The non-transitory computer-readable medium of claim 16, wherein the offset is based on a size of the first device or the second device.

18. The non-transitory computer-readable medium of claim 17, wherein the size of the first device or the second device is a distance between a camera and a display.

* * * * *